(12) United States Patent
Keenum et al.

(10) Patent No.: US 7,287,913 B2
(45) Date of Patent: *Oct. 30, 2007

(54) CONNECTOR PORT FOR NETWORK INTERFACE DEVICE

(75) Inventors: John A. Keenum, Haltom City, TX (US); Brad N. Grunwald, Euless, TX (US); Stephen G. Bloodworth, Ft. Worth, TX (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/145,275

(22) Filed: Jun. 3, 2005

(65) Prior Publication Data

US 2005/0220421 A1    Oct. 6, 2005

Related U.S. Application Data

(63) Continuation of application No. 10/784,610, filed on Feb. 23, 2004, now Pat. No. 6,926,449.

(51) Int. Cl.
*G02B 6/36* (2006.01)
*G02B 3/38* (2006.01)
*G02B 6/00* (2006.01)

(52) U.S. Cl. .......................... 385/76; 685/59; 685/135; 685/136

(58) Field of Classification Search ................ 385/76, 385/89, 92, 135
See application file for complete search history.

(56) References Cited

U.S. PATENT DOCUMENTS 5,042,901 A    8/1991  Merriken et al. ............ 385/135
5,745,633 A *  4/1998  Giebel et al. ................ 385/136
5,778,122 A    7/1998  Giebel et al. ................. 385/55
5,870,515 A *  2/1999  Ott et al. ........................ 385/59
5,892,870 A    4/1999  Fingler et al. ................ 385/59
6,385,381 B1   5/2002  Janus et al. .................. 385/135
6,496,641 B1  12/2002  Mahony ....................... 385/135
6,522,804 B1   2/2003  Mahony ....................... 385/24
6,539,147 B1   3/2003  Mahony ....................... 385/24
6,579,014 B2 * 6/2003  Melton et al. ................ 385/76
6,591,053 B2 * 7/2003  Fritz ........................... 385/135
6,614,980 B1   9/2003  Mahony ....................... 385/135

(Continued)

OTHER PUBLICATIONS

Corning Product Specifications, FTTH/CATV Indoor/Outdoor Network Interface Device, Feb. 2002, 2 pages.
Corning Product Specifications, SABRE® Enclosure, May 2003, 2 pages.

*Primary Examiner*—Frank G. Font
*Assistant Examiner*—Charlie Peng
(74) *Attorney, Agent, or Firm*—Keith A. Roberson

(57) ABSTRACT

A connector port is adapted for a (NID) to receive a connectorized optical fiber from inside the NID and a pre-connectorized drop cable from outside the NID. An exterior connector port includes a base positioned within an opening defined by an external wall of the NID, a mount on the base and a connector receptacle secured to the mount adjacent the external wall. An interior connector port includes an insert positioned within an opening defined by an external wall of the NID, a bracket mounted inside the NID and a connector receptacle secured to the bracket. A connector port also includes an insert positioned within an opening defined by a wall of the NID and a connector port secured to the insert. The connector port permits a field technician to readily connect, disconnect and reconfigured optical connections between the connectorized optical fiber and the pre-connectorized drop cable in the field.

5 Claims, 3 Drawing Sheets

U.S. PATENT DOCUMENTS

| | | | |
|---|---|---|---|
| 6,625,375 B1 | 9/2003 | Mahony | 385/135 |
| 6,648,520 B2 | 11/2003 | McDonald et al. | 385/78 |
| 6,661,961 B1 * | 12/2003 | Allen et al. | 385/135 |
| 6,668,127 B1 | 12/2003 | Mahony | 385/135 |
| 6,721,484 B1 * | 4/2004 | Blankenship et al. | 385/135 |
| 6,792,191 B1 * | 9/2004 | Clapp et al. | 385/135 |
| 6,802,724 B1 | 10/2004 | Mahony | 439/135 |
| 2004/0062508 A1 * | 4/2004 | Blankenship et al. | 385/134 |
| 2004/0228598 A1 * | 11/2004 | Allen et al. | 385/135 |
| 2005/0175307 A1 * | 8/2005 | Battey et al. | 385/135 |

\* cited by examiner

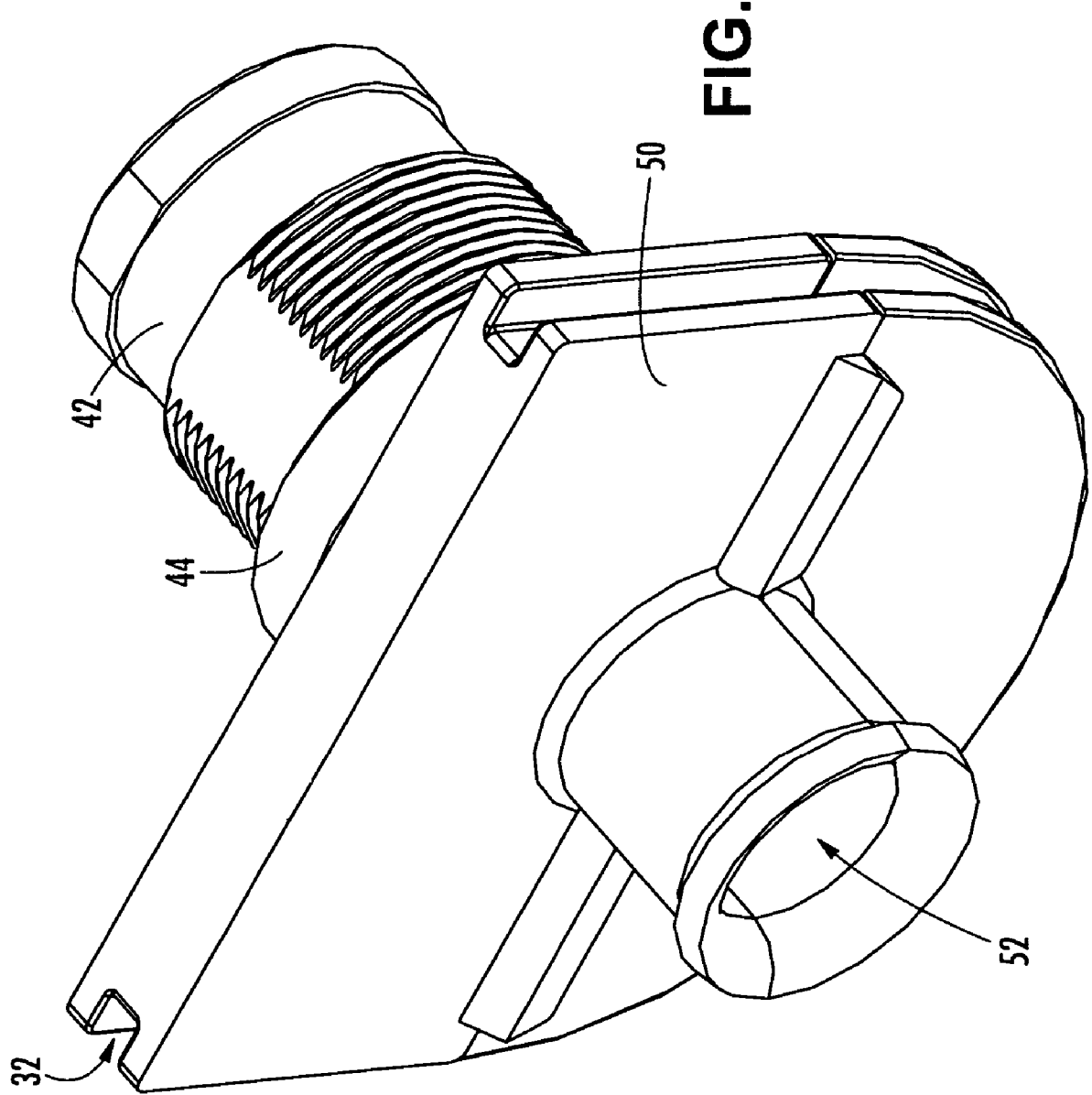

CONNECTOR PORT FOR NETWORK INTERFACE DEVICE

CROSS-REFERENCE TO RELATED APPLICATION

This application is a continuation of application Ser. No. 10/784,610, filed 23 Feb. 2004, now issued U.S Pat. No. 6,926,449.

BACKGROUND OF THE INVENTION

1. Field of the Invention

The present invention relates generally to a connector port for use in an optical network, and more particularly, to a connector port adapted for a network interface device (NID) to receive a connectorized optical fiber from inside the NID and a pre-connectorized fiber optic drop cable from outside the NID.

2. Description of the Related Art

Optical fiber is increasingly being used for a variety of broadband applications including voice, video and data transmissions. As a result of the ever-increasing demand for broadband communications, fiber optic networks typically include a large number of mid-span access locations at which one or more optical fibers are branched from a distribution cable. These mid-span access locations provide a branch point from the distribution cable leading to an end user, commonly referred to as a subscriber, and thus, may be used to extend an "all optical" communications network closer to the subscriber. In this regard, fiber optic networks are being developed that deliver "fiber-to-the-curb" (FTTC), "fiber-to-the-business" (FTTB), "fiber-to-the-home" (FTTH), or "fiber-to-the-premises" (FTTP), referred to generically as "FTTx." Based on the rapid proliferation of these fiber optic networks, it is desirable to provide communications hardware and equipment operable for readily connecting a subscriber to the fiber optic network.

With an FTTx optical network, subscribers may purchase different voice, video and data communication services from a single service provider, such as a telephone company, and equip their homes, businesses or the like with communications equipment, such as a telephone, television, facsimile machine, computer, etc., to utilize such services. The subscriber is responsible for proper operation of the subscriber's communications equipment and wiring, while the service provider is responsible for the proper operation of the optical network equipment and wiring up to the network interface, commonly referred to as the "demarcation point," between the service provider wiring and the subscriber wiring. The demarcation point is accessible to both the subscriber and the service provider and is typically located at the subscriber premises in a network interface device (NID) or a building entrance terminal (BET) that is mounted on the exterior wall of a home, office, apartment, commercial or residential building, or the like.

To connect the subscriber to the optical network, one or more drop cables are optically connected between a distribution cable and the demarcation point in the NID at the subscriber premises. Substantial expertise and experience are required to configure the optical connections between the drop cable and the distribution cable, and between the drop cable and the subscriber wiring in the field. In particular, it is often difficult to enter the NID and to join the optical fibers of the drop cable with the optical fibers leading from the subscriber's communications equipment using conventional splicing techniques, such as fusion splicing. In other instances, the optical fibers of the drop cable are first spliced to a short length of optical fiber having an optical connector mounted upon the other end, referred to in the art as a "pigtail." The pigtail is then routed to one side of a connector adapter sleeve located in the NID to interconnect the drop cable with a connectorized optical fiber leading from the subscriber's communications equipment. In either case, the process of entering the NID and fusion splicing optical fibers is not only time consuming, but frequently must be accomplished by a highly skilled field technician at significant cost and under working conditions in the field that are less than ideal. Further, once the optical connections are made, it is often labor intensive, and therefore costly, to disconnect or reconfigured the existing optical connections, or to make additional optical connections.

In order to reduce costs by permitting less experienced and less skilled technicians to connect, disconnect and reconfigured optical connections in the field, communications service providers are increasingly pre-engineering new fiber optic networks and demanding factory-prepared interconnection solutions, commonly referred to as "plug-and-play" type systems. Pre-engineered networks, however, require that certain optical fibers within the network be pre-connectorized and that optical connection terminals in the network be adapted to receive the pre-connectorized optical fibers, for example a pre-connectorized drop cable at a subscriber NID. With regard to a factory-prepared plug-and-play system for connecting a subscriber's communications equipment to an optical network at a demarcation point, it would be desirable to provide a connector port adapted for a NID to receive a connectorized optical fiber from inside the NID and a pre-connectorized fiber optic drop cable from outside the NID. It would also be desirable in an FTTx optical network to provide a NID having a connector port that is operable to readily interconnect a connectorized optical fiber from inside the NID with a feeder cable, branch cable or distribution cable of the optical network by means of a pre-connectorized fiber optic drop cable. It would also be desirable to provide a connector port and a NID for use in an FTTx optical network that permits a less experienced and less skilled field technician to readily connect, disconnect and reconfigured optical connections in the field.

BRIEF SUMMARY OF THE INVENTION

To achieve the foregoing and other objects, and in accordance with the purposes of the invention as embodied and broadly described herein, the present invention provides various embodiments of a connector port for use in a fiber optic communications network and adapted for a NID to receive a connectorized optical fiber from inside the NID and a pre-connectorized fiber optic drop cable from outside the NID. In various embodiments, the pre-connectorized fiber optic drop cable may be routed to the NID from an upstream component in the optical network, such as from a feeder cable, branch cable or distribution cable, a network access point (NAP) closure, a distribution terminal, a multi-port optical connection terminal or another NID. In various embodiments, the connector port permits a less experienced and less skilled field technician to readily connect, disconnect or reconfigured optical connections between a pre-connectorized drop cable and a connectorized optical fiber leading from the subscriber's communications equipment in order to extend an "all-optical" communications network to a subscriber premises.

In an exemplary embodiment, the present invention is a connector port adapted for a NID and utilized in an optical network to interconnect a subscriber's communications equipment with a pre-connectorized fiber optic drop cable. The connector port includes a connector receptacle for optically connecting a connectorized optical fiber from inside the NID to a pre-connectorized drop cable from outside the NID, and a mount for securing the connector receptacle adjacent a drop cable opening formed in an external wall of the NID.

In another exemplary embodiment, the present invention is an exterior connector port adapted for mounting to a NID adjacent an external wall of the NID defining a cable opening. The exterior connector port includes a base, a cover for covering the base such that the base and the cover define a cavity, a connector receptacle secured to the base within the cavity, at least one slot defined by at least one of the base and cover for receiving a pre-connectorized fiber optic drop cable, and means for securing the base to the external wall of the NID. The exterior connector port provides an optical connection between the pre-connectorized fiber optic drop cable from outside the NID and a connectorized optical fiber from inside the NID. The exterior connector port further functions as a demarcation point between a fiber optic communications network and a subscriber premises that permits a less experienced and less skilled field technician to readily connect, disconnect or reconfigured the optical connection.

In yet another exemplary embodiment, the present invention is an interior connector port adapted for a NID having an opening defined in an external wall of the NID for receiving a pre-connectorized fiber optic drop cable. The interior connector port includes a bracket mounted within the NID and a connector receptacle secured to the bracket. The connector receptacle is provided to permit a less experienced and less skilled field technician to readily connect, disconnect and reconfigured an optical connection between the pre-connectorized fiber optic drop cable and a connectorized optical fiber leading from a subscriber's communications equipment. The connector receptacle includes a first end configured for receiving a connectorized optical fiber from inside the NID and a second end configured for receiving the pre-connectorized fiber optic drop cable.

In yet another exemplary embodiment, the present invention is a connector port assembly adapted to be located within an external wall of a NID at a subscriber premises for readily connecting and disconnecting a pre-connectorized fiber optic drop cable of an optical communications network. The connector port assembly includes an insert that is positioned in a cable opening defined by the external wall of the NID, a connector receptacle mounted to the insert and a central opening defined by the insert operable for receiving and allowing the pre-connectorized fiber optic drop cable to pass through. The connector port assembly is configured to permit a field technician to readily connect, disconnect and reconfigured an optical connection between the pre-connectorized fiber optic drop cable and a connectorized optical fiber leading from a subscriber's communications equipment.

In yet another exemplary embodiment, the present invention is a NID including a connector port for receiving a pre-connectorized fiber optic drop cable at a subscriber premises. The NID includes a housing defining the external wall and an interior cavity, a cable opening formed through the external wall, a connector port insert positioned within the cable opening for mounting a connector receptacle adjacent the connector port insert. The connector receptacle includes a first end configured for receiving a connectorized optical fiber from inside the NID and a second end configured for receiving the pre-connectorized fiber optic drop cable.

BRIEF DESCRIPTION OF THE DRAWINGS

These and other features, aspects and advantages of the present invention are better understood when the following detailed description of the invention is read with reference to the accompanying drawings, in which:

FIG. 3 is a perspective view of an insert adapted for a NID that comprises a connector receptacle and is configured to be positioned within a drop cable opening provided in a wall of the NID in accordance with another exemplary embodiment of the present invention.

DETAILED DESCRIPTION OF THE INVENTION

Figure 1:
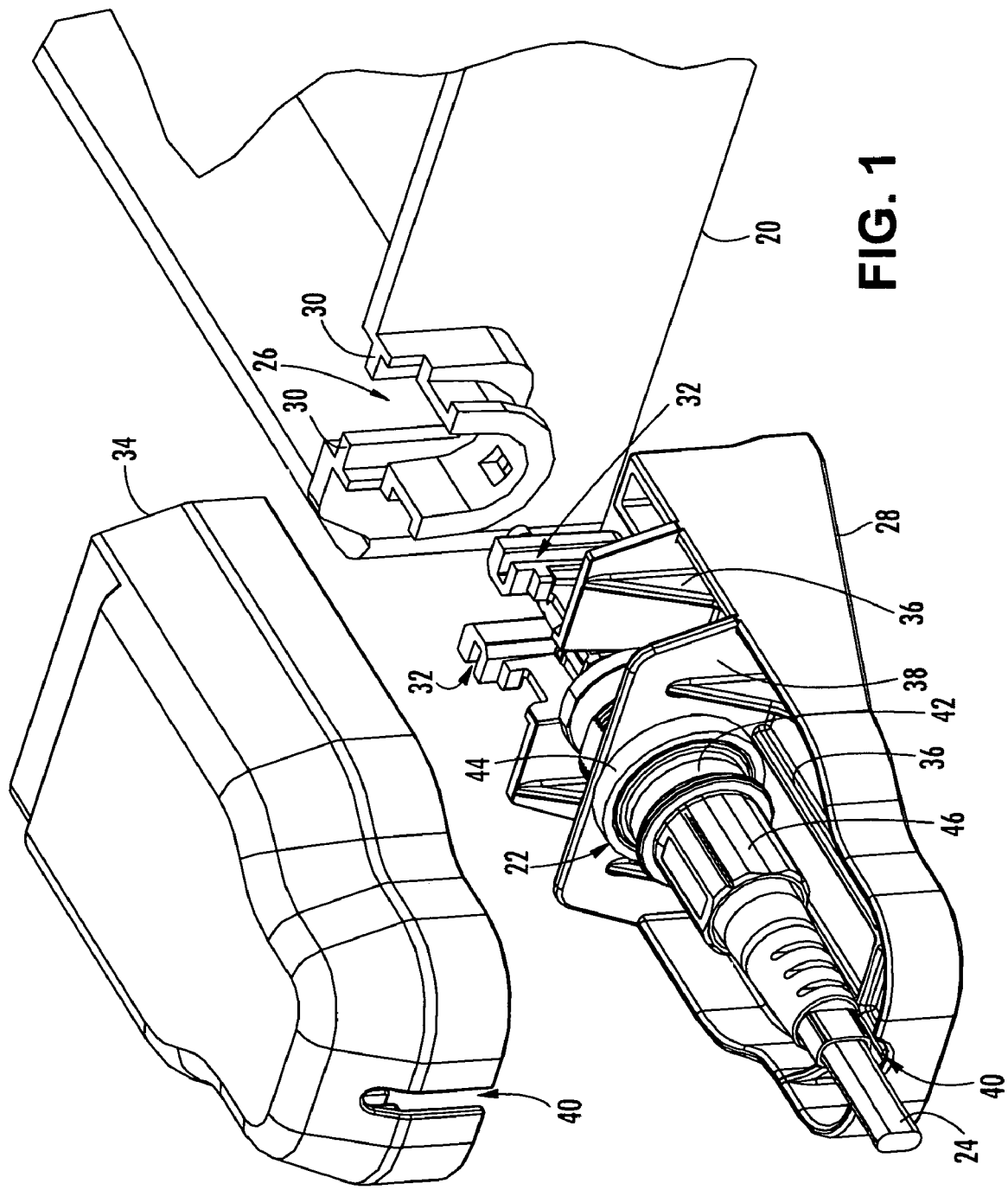
FIG. 1 is a perspective view of an exterior connector port adapted for a NID that comprises a connector receptacle secured adjacent an external wall of the NID in accordance with an exemplary embodiment of the present invention.

The present invention will now be described more fully hereinafter with reference to the accompanying drawings in which exemplary embodiments of the invention are shown. However, this invention may be embodied in many different forms and should not be construed as limited to the embodiments set forth herein. These exemplary embodiments are provided so that this disclosure will be both thorough and complete, and will fully convey the scope of the invention to those skilled in the art. Like reference numbers refer to like elements throughout the various drawings.

The present invention provides various exemplary embodiments of a connector port adapted for a network interface device (NID) to receive a connectorized optical fiber from inside the NID and a pre-connectorized fiber optic drop cable from outside the NID. In all embodiments, the connector port is operable for permitting a field technician to readily connect, disconnect or reconfigured a pre-connectorized fiber optic drop cable of a fiber optic communications network. The connector port may include a connector adapter sleeve disposed within a connector receptacle, or may be configured to receive a pair of mating optical connectors in any suitable manner now known or hereafter devised. Regardless, the connector port is configured for making an optical connection between a connectorized optical fiber from inside the NID and a pre-connectorized fiber optic drop cable from outside the NID. In an exemplary embodiment described herein, an exterior connector port is secured adjacent a drop cable opening defined in an external wall of the NID. In another exemplary embodiment described herein, an interior connector port is secured to a bracket that is mounted within an interior cavity defined by the NID. In yet another exemplary embodiment described herein, a connector port is secured to an insert positioned within a drop cable opening defined by an external wall of the NID, such as the bottom wall of the NID.

In each of the exemplary embodiments shown and described herein, a connectorized optical fiber is routed to the connector port from inside the NID. Alternatively, an optical fiber from inside the NID may be spliced to an optical fiber having an optical connector mounted on the other end (i.e., a "pigtail") and the pigtail routed to the connector port. Once the optical fiber is connectorized and routed to the connector port, a pre-connectorized drop cable is then routed to the connector port from outside the NID at any time subsequent to the initial installation of the NID. The size of the NID may vary based upon the amount of optical fiber slack stored within the NID, the number of connector ports provided, and thin number and size of any additional passive or active optical, electronic or opto-electronic equipment housed within the NID.

In certain embodiments, the connector port is secured to an insert whose shape may vary somewhat based on the specific design of the NID, and in particular, the size and shape of the opening provided for receiving a drop cable. One example of a NID design that may be used in conjunction with the connector port of the present invention is an FTTH/CATV Indoor/Outdoor Network Interface Device available from Corning Cable Systems LLC of Hickory, N.C. Another possible NID design is the SABRE® Enclosure also available from Corning Cables Systems LLC of Hickory, N.C. Both these NID designs comprise a base defining a cable opening formed through the bottom wall of the NID. The cable opening comprises a slot for receiving a grommet that may be removed and replaced with an insert of a connector port according to the invention.

As used herein, the term "connector port" is intended to refer generally to the structure and location at which a connectorized optical fiber from inside the NID is optically connected to a pre-connectorized fiber optic drop cable from outside the NID. The connector port may also include a generic or universal connector receptacle for receiving the connectors of the connectorized optical fiber and the pre-connectorized drop cable. Preferably, the connector receptacle is configured to receive a pair of mating single or multifiber ferrules mounted upon the end portions of respective optical fibers. One of the ferrules is mounted upon the end portion of the optical fiber(s) of a cable, ribbon, or optical device housed within the NID and leading from a subscriber's communications equipment. The other ferrule is mounted upon the end portion of the optical fiber(s) of the pre-connectorized drop cable leading from a component of the optical network located upstream of the NID, such as a feeder cable, branch cable or distribution cable, a network access point (NAP) closure, a distribution terminal, a multi-port optical connection terminal or another NID. The ferrules are then brought into alignment and optical engagement by a connector adapter sleeve positioned within a cavity defined by the connector receptacle. If present, the connector adapter sleeve assists in gross alignment of the ferrules, and ferrule guide pins or other alignment means may be provided to assist in detailed alignment of the optical fibers on the end faces of the ferrules. In further embodiments, the connector receptacle may comprise a biasing member that operably engages the connector adapter sleeve so as to urge the sleeve toward one end of the connector receptacle, and thereby floatingly align the mating ferrules engaged within the sleeve.

The connector port may be adapted to accommodate a variety of connector types, such as but not limited to, simplex and/or duplex SC, LC, DC, FC, ST, SC/DC, MT-RJ, MTP and MPO ferrules. The factory pre-connectorized drop cable may be strain or torsion relieved through the connector to the connector port or associated structural components, thereby eliminating the need for a field technician to strain or torsion relieve the drop cable to the NID in the field. By providing strain and/or torsion relief at the connector port, conventional brackets or other hardware for engaging the outer sheath or strength members of the drop cable are not needed. In addition to providing strain or torsion relief, the connector port may provide an environmental seal at the interface between the connectorized optical fiber and the pre-connectorized fiber optic drop cable. Furthermore, any unused connector ports may be covered and sealed with a removable cap or plug.

In one example, the upstream end of a fiber optic drop cable is optically connected to one or more optical fibers of a feeder cable, branch cable or distribution cable of the communications network within a conventional network access point (NAP) closure, a distribution terminal, a multi-port optical connection terminal, a local convergence cabinet (LCC) or a pedestal of the types available from Corning Cable Systems LLC of Hickory, N.C., with the other end being optically connected at the NID to one or more connectorized optical fibers leading from a subscriber's communications equipment. In serving the foregoing function, the present invention facilitates the deployment of an "all-optical" FTTx communications network.

Referring now to FIG. 1, a NID 20 is shown having an exterior connector port 22 to receive a pre-connectorized fiber optic drop cable 24 at a subscriber premises. The exterior connector port 22 permits an optical fiber of the pre-connectorized fiber optic drop cable 24 to be readily interconnected with a connectorized optical fiber (not shown) from inside the NID 20. As is well known and understood by those skilled in the art, the pre-connectorized drop cable 24 comprises a flexible transport tube containing one or more optical fibers that are optically connected to a fiber optic communications network. The exterior connector port 22 provides a convenient termination point in an optical network to permit a less experienced and less skilled field technician to initially install and subsequently disconnect or reconfigured optical connections at the NID 20.

While only a portion of the NID 20 is shown in FIG. 1, the NID 20 is intended to include, but is not limited to, any enclosure, container or housing, such as a NID, building entrance terminal (BET), pedestal or optical network unit (ONU) purchased by or for a subscriber to obtain communication services from a service provider. In addition, the NID 20 typically provides a demarcation point between the subscriber's communications equipment and the optical network at a residence, business, or the like. The NID 20 may be of any shape or size provided that it comprises at least one drop cable opening 26 defined by an external wall of the NID 20. The drop cable opening 26 is typically occupied by a grommet that protects the interior of the NID from adverse environmental elements, such as infestation, dirt, dust, moisture and wind-driven rain, and that can be removed or modified (e.g., slit) to allow a drop cable to pass through. The NID 20 is typically mounted on the exterior wall of a home, office, apartment, commercial or residential building, or the like. However, the NID 20 may be installed on an interior wall or within a larger enclosure, such as a telecommunications cabinet or distribution terminal. The NID 20 further comprises optical hardware and equipment (not shown) mounted within an interior cavity defined by the NID for delivering the communication services provided by the service provider. A connectorized optical fiber (not shown) optically connected to the subscriber's communications equipment is routed to the exterior connector port 22 from inside the NID 20 and optically connected to an optical fiber of the pre-connectorized drop cable 24 in any known manner.

The drop cable opening 26 is located within an external wall of the NID 20, and preferably within the bottom wall of the NID, and comprises one or more structural features for engaging a base 28 of the exterior connector port 22. In the embodiment shown, the structural features comprise a pair of tabs 30 adapted to be received within corresponding slots 32 defined by the base 28. The base 28 may be secured within the drop cable opening 26 when the cover (not shown) of the NID 20 is in an opened position. The pre-connectorized drop cable 24 may then be optically connected to a connectorized optical fiber (not shown) routed to the exterior connector port 22 from inside the NID 20. Once the optical connection is made, a cover 34 may be positioned over the base 28 to protect, seal and/or prevent unauthorized access to the exterior connector port 22. In certain NID designs, the NID comprises two or more covers that may be opened independently to expose and thereby provide access to different areas, referred to as "compartments," of the NID. For example, a first door (not shown) may be opened by both the subscriber and the service provider to expose a subscriber compartment containing optical terminations and means for testing the subscriber wiring and operation of the subscriber's communications equipment in a known manner. A second door (not shown), commonly referred to as the service provider access door, may be opened only by the service provider to provide access to a service provider compartment containing equipment, optical terminations and/or service provider wiring that only the service provider is intended to access. The base 28 and the cover 34 may be inserted into the drop cable opening 26 underneath the second door in order to restrict access to the exterior connector port 22 to the service provider. Conversely, the cover 34 may be positioned between the first door and the second door of the NID in order to permit access to the exterior connector port 22 to both the service provider and the subscriber, while preventing unauthorized access to the exterior connector port 22.

The NID 20, base 28 and cover 34 are preferably each made of a lightweight, yet rigid material, such as aluminum, plastic or thermoplastic. If necessary, the base 28 and cover 34 may be provided with lengthwise and/or widthwise stiffening ribs 36 to strengthen and prevent distortion of the base 28 and cover 34, respectively. The base 28 and cover 34 together define a small enclosure for housing the exterior connector port 22 and the end portions of the connectorized optical fiber and the pre-connectorized drop cable 24. The base 28 and cover 34 may have any of a variety of shapes that is suitable for housing the exterior connector port 22 and the end portions of the connectorized optical fiber and the pre-connectorized drop cable 24 provided that one or the other integrally defines, or is configured to accept, a mount 38 for securing the exterior connector port 22 adjacent the drop cable opening 26. The base 28 and cover 34 of the embodiment illustrated in FIG. 1 are generally elongated in the lengthwise dimension relative to the lateral dimension. Preferably, the cover 34 is removably attached to the base 28 to provide unobstructed access to the exterior connector port 22. Optionally, the base 28 or the cover 34 is provided with conventional fasteners for securing the cover 34 and the base 28 together in a closed configuration. A sealing gasket (not shown) may also be disposed between the base 28 and the cover 34 to provide a seal against adverse environmental elements, such as infestation, dirt, dust, moisture and wind-driven rain.

The exemplary embodiment illustrated in FIG. 1 comprises an exterior connector port 22 for connecting a single pre-connectorized fiber optic drop cable 24 to one or more connectorized optical fibers from inside the NID 20. Although only one exterior connector port 22 is shown in FIG. 1, it is envisioned and will be readily apparent to one of ordinary skill in the art that the base 28 and cover 34 may be configured to accommodate more than one exterior connector port 22. Thus, it is conceivable that the NID 20 may receive more than one pre-connectorized fiber optic drop cable 24, each containing one or more optical fibers optically connected to respective optical fibers of the fiber optic communications network.

Still referring to FIG. 1, the pre-connectorized drop cable 24 is shown entering the base 28 and cover 34 through a slot 40 defined by at last one of the base 28 and cover 34. The pre-connectorized drop cable 24 is typically installed through the bottom wall of the NID 20 so that a short length of the drop cable 28 extends below the NID 20 and forms a drip loop in a known manner to direct moisture away from the NID 20. Inside the base 28, a connector receptacle 42 is secured to the mount 38. As shown, a portion of the connector receptacle 42 is inserted through the mount 38. The connector receptacle 42 may be secured within the mount 38 using a threaded nut 44, a snap-fit, a press-fit, or other similar securing means. The connector 46 at the end of the pre-connectorized drop cable 24 is routed from outside the NID 20 into the base 28 and inserted into the connector receptacle 42 of the exterior connector port 22. With the cover 34 removed (as shown), the interior of the base 28 is readily accessible to a field technician installing the connector receptacle 42 into the mount 38 and optically connecting the connector 46 of the pre-connectorized drop cable 24 to a mating connector of the connectorized optical fiber routed from inside the NID 20. Once the connector receptacle 42 is initially installed and the pre-connectorized fiber optic drop cable 24 connected to the connectorized optical fiber, a field technician may subsequently disconnect the drop cable 24 or reconfigured (e.g., connect a different) drop cable 24 without disturbing the equipment and optical and/or electrical connections housed within the interior cavity defined by the NID 20.

Figure 2:
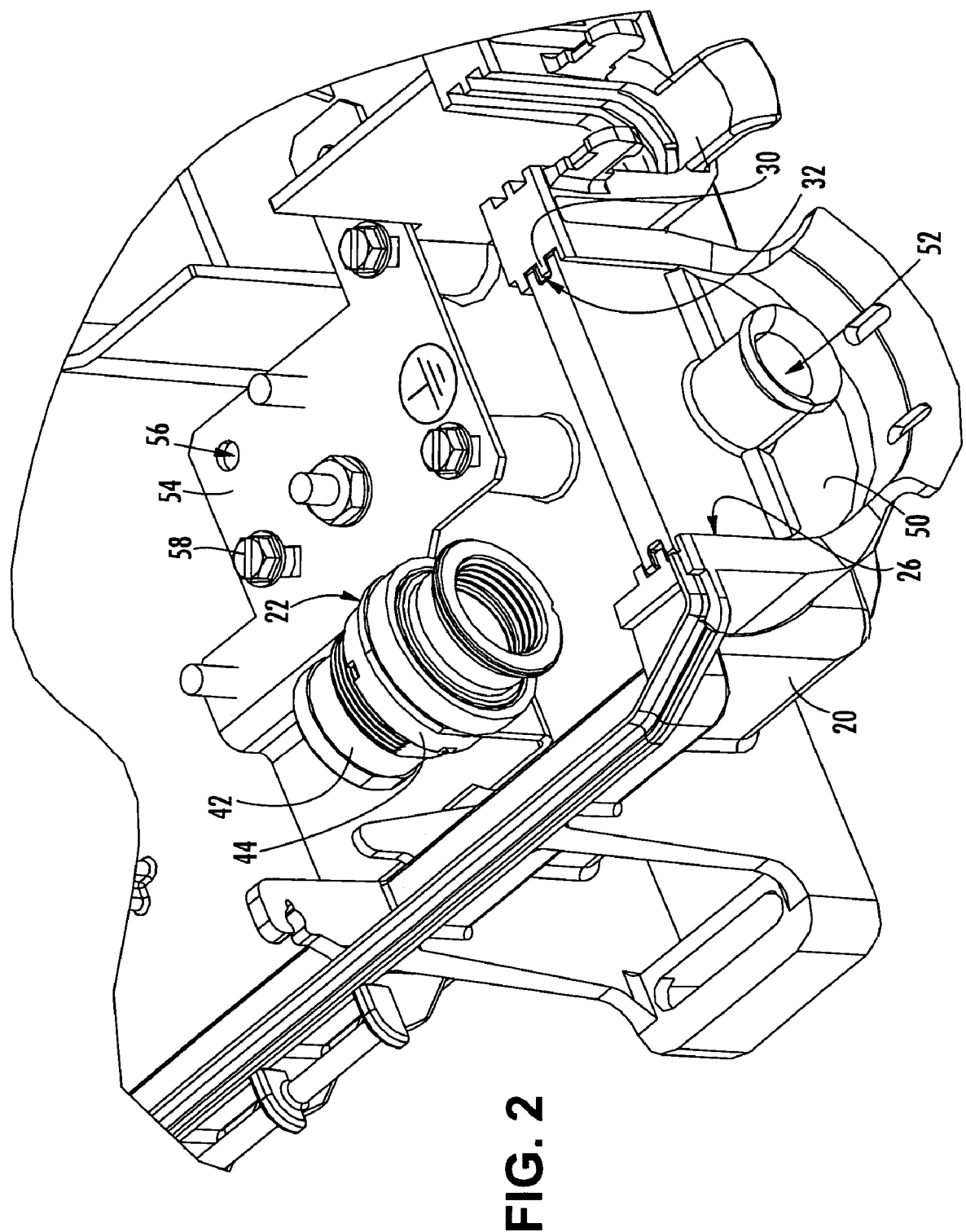
FIG. 2 is a perspective view of an interior connector port adapted for a NID that comprises a connector receptacle secured to a bracket mounted within an internal cavity of the NID in accordance with another exemplary embodiment of the present invention.

Referring now to FIG. 2, a cut-away portion of the NID 20 comprising an interior connector port 22 constructed in accordance with another embodiment of the present invention is shown with the cover of the NID 20 removed, thereby exposing the interior cavity of the NID 20 and its contents. As with the embodiment described above, the NID 20 illustrated in FIG. 2 is intended to include, but is not limited to, any enclosure, container or housing, such as a NID, building entrance terminal (BET), pedestal or optical network unit (ONU) purchased by or for a subscriber to obtain communication services from a service provider. The NID 20 may be of any shape or size provided that it defines a drop cable opening 26 in an external wall of the NID 20. As previously described, the drop cable opening 26 is typically occupied by a grommet that protects the interior of the NID from adverse environmental elements, such as infestation, dirt, dust, moisture and wind-driven rain, and that can be removed or modified (e.g., slit) to allow a drop cable to pass through. In this embodiment, however, the drop cable opening 26 is occupied by an insert 50 positioned within the drop cable opening 26 and having a circular or cylindrical passageway 52 therethrough for receiving and guiding a pre-connectorized drop cable 24 (not shown) into the NID 20. In the embodiment shown, the insert 50 is comprised of two pieces that are secured around the pre-connectorized drop cable 24 and positioned within the drop cable opening 26.

As previously described, the drop cable opening 26 is located within an external wall of the NID 20, and preferably within the bottom wall of the NID, and comprises one or more structural features for engaging the insert 50. In the embodiment shown, the structural features comprise a pair of tabs 30 adapted to be received within corresponding slots 32 defined by the insert 50. The insert 50 may be positioned within the drop cable opening 26 with the end portion of the pre-connectorized drop cable 24 extending into the interior cavity of the NID 20 when the cover (not shown) of the NID 20 is in an opened position. The interior connector port 22 is secured to a bracket 54 that is mounted to an interior surface of the NID 20, for example the rear wall of the NID 20. The bracket 54 has a plurality of holes 56 formed therethrough for receiving fasteners 58 or similar securing means, to secure the bracket 54 within the interior cavity of the NID 20. The bracket 54 is configured to mount a connector receptacle 42, as previously described, thereon for optically connecting the end portions of the connectorized optical fiber and the pre-connectorized fiber optic drop cable 24. Preferably, the connector receptacle 42 and the passageway 52 formed by the insert 50 are axially aligned. The insert 50 and bracket 54 are each preferably made of a lightweight, yet rigid material, such as aluminum, plastic or thermoplastic. Furthermore, the bracket 54 and the insert 50 may have any of a variety of shapes that is suitable for mounting the connector receptacle 42 and receiving the pre-connectorized drop cable 24.

The connectorized optical fiber (not shown) is routed from inside the NID 20 and inserted into a first end of the connector receptacle 42. The pre-connectorized drop cable 24 (not shown) extending into the NID 20 is then inserted into a second end of the connector receptacle 42 so that the end portions of the connectorized optical fiber and the pre-connectorized fiber optic drop cable 24 are optically connected inside the NID 20. The pre-connectorized drop cable 24 is routed to the connector port 22 when the cover (not shown) of the NID 20 is opened, thereby exposing the interior cavity of the NID 20. With the cover opened, the connector receptacle 42 is readily accessible to a field technician optically connecting a connectorized optical fiber to the pre-connectorized fiber optic drop cable 24. Once the connector receptacle 42 is initially installed and the pre-connectorized fiber optic drop cable 24 connected to the connectorized optical fiber, a field technician may subsequently disconnect the drop cable 24 or reconfigured (e.g., connect a different) drop cable 24 by simply opening the cover of the NID 20 in a known manner.

The exemplary embodiment illustrated in FIG. 2 comprises an interior connector port 22 for connecting a single pre-connectorized fiber optic drop cable 24 to one or more connectorized optical fibers from inside the NID 20. Although only one interior connector port 22 is shown in FIG. 2, it is envisioned and will be readily apparent to one of ordinary skill in the art that the insert 50 and the bracket 54 may be configured to accommodate more than one interior connector port 22. Thus, it is conceivable that the NID 20 may receive more than one pre-connectorized fiber optic drop cable 24, each containing one or more optical fibers optically connected to respective optical fibers of the fiber optic communications network.

The pre-connectorized fiber optic drop cable 24 enters the NID 20 through passageway 52 formed by insert 50 mounted within drop cable opening 26 defined by an external wall of the NID 20. The pre-connectorized drop cable 24 is typically installed through the bottom wall of the NID 20 so that a short length of the drop cable 24 extends below the NID 20 and forms a drip loop in a known manner to direct moisture away from the NID 20. The end portion of the pre-connectorized drop cable 24 extends into the interior cavity of the NID 20 and is routed to the second end of the connector receptacle 42. In the interior cavity of the NID 20, the connector receptacle 42 is secured to the bracket 54. As shown, a portion of the connector receptacle 42 is inserted through the bracket 54. The connector receptacle 42 may be secured within the bracket 54 using a threaded nut 44, a snap-fit, a press-fit, or other similar securing means.

Referring now to FIG. 3, an insert 50 adapted for a NID 20 and configured to be positioned within a drop cable opening 26 provided in a wall of the NID 20 according to another exemplary embodiment of the present invention is shown. The insert 50 defines a circular or cylindrical passageway 52 for receiving a pre-connectorized fiber optic drop cable 24. A connector receptacle 42, as previously described, is secured to the insert 50, and the insert 50 is then positioned within a drop cable opening 26, or a similar opening or groove, defined by an internal or external wall of the NID 20. As shown, the passageway 52 is formed by two pieces that are brought together to form the insert 50, each of which defines a semi-circular portion of the passageway 52. The insert 50, including the connector receptacle 42, is preferably made of a lightweight, yet rigid material, such as aluminum, plastic or thermoplastic. The connector receptacle 42 is secured to the insert 50 in any suitable manner such that the center of the connector receptacle 42 is approximately coincident with the lengthwise axis of the passageway 52. Preferably, the insert 50 is positioned within an external wall of the NID 20 with the connector receptacle 42 located within the interior cavity of the NID 20. In the embodiment shown in FIG. 3, a portion of the connector receptacle 42 is inserted through the insert 50 such that one end of the connector receptacle 42 abuts the passageway 52. The connector receptacle 42 may be secured to the insert 50 using a threaded nut 44, a snap-fit, a press-fit, or other similar securing means. A connectorized optical fiber (not shown) is routed to the first end of the connector receptacle 42 from inside the NID 20 and the end portion of the pre-connectorized fiber optic drop cable 24 (not shown) is routed from outside the NID 20 to the second end of the connector receptacle 42 to permit an optical fiber of the pre-connectorized drop cable 24 to be readily interconnected with the connectorized optical fiber in the manner previously described. As such, the insert 50 is operable for receiving a pre-connectorized fiber optic drop cable 24 at a subscriber premises.

The insert 50 is preferably positioned within a drop cable opening 26 having any suitable size or shape defined by an external wall of the NID 20. The drop cable opening 26 provided in conventional NIDs, such as the FTTH/CATV Indoor/Outdoor Network Interface Device and the SABRE® Enclosure available from Corning Cables Systems LLC of Hickory, N.C., is typically occupied by a grommet that may be removed or modified to accommodate the insert 50. The NID 20 is preferably mounted on the exterior wall of a home or building with the insert 50 positioned within a drop cable opening 26 defined by the bottom wall of the NID 20 so that a short length of the drop cable 24 extends below the NID 20 and forms a drip loop in a known manner to direct moisture away from the NID 20. As previously mentioned, a connectorized optical fiber from inside the NID 20 is routed into the first end of the connector receptacle 42 and the end portion of the pre-connectorized drop cable 24 is inserted from outside the NID 20 through the passageway 52 formed by the insert 50 into the second end of the connector receptacle 42.

As previously described, the drop cable opening 26 comprises one or more structural features for engaging the insert 50. For example, the structural features may comprise a pair of tabs adapted to be received within corresponding slots 32 defined by the insert 50. The insert 50 may be positioned within the drop cable opening 26 when the cover (not shown) of the NID 20 is in an opened position. Once the optical connections have been made as described above, the cover of the NID 20 is closed to further secure the insert 50 in place within the drop cable opening 26. The insert 50 may be positioned within the drop cable opening 26 underneath a service provider access cover in order to restrict access to the connector receptacle 42 and the connectorized optical fiber. Although this embodiment has been described such that the connector receptacle 42 is located within the internal cavity of the NID 20, it is envisioned and will be readily apparent to one of ordinary skill in the art that the insert 50 may be positioned within the drop cable opening 26 so that the passageway 52 is located within the interior cavity of the NID 20 and the connector receptacle 42 is located outside the NID 20. In the event that the connector receptacle 42 is located outside the NID 20, the first end and the second end of the connector receptacle 42 may be reversed to permit the pre-connectorized drop cable 24 to be more easily inserted into the connector receptacle 42 from outside the NID 20.

The exemplary embodiments of a connector port adapted for a NID and operable for readily interconnecting a pre-connectorized fiber optic drop cable from outside the NID with a connectorized optical fiber from inside the NID shown and described herein provide a number of significant advantages. For purposes of example only, and not by way of limitation, a connector port constructed in accordance with the invention provides a field technician with the ability to readily connect, disconnect and reconfigured a pre-connectorized fiber optic drop cable in a plug-and-play connector port adjacent to an external wall of the NID, within the interior cavity of the NID, or through an external wall of the NID. In addition, connectorized optical fibers from the inside of the NID may be routed to the connector port during initial installation, thus eliminating the need for a field technician to enter the NID to connect a pre-connectorized drop cable at any time following the initial installation. Thus, a NID and connector port constructed in accordance with the present invention eliminates the need for fusion splicing or mechanically splicing a fiber optic drop cable to an optical fiber in the field to connect a subscriber to an optical communications network.

The foregoing is a description of various embodiments of the invention that are provided here by way of example only. Although a connector port for use in an optical network and adapted for a NID has been described with reference to preferred embodiments and examples thereof, other embodiments and examples may perform similar functions and/or achieve similar results. All such equivalent embodiments and examples are within the spirit and scope of the present invention and are intended to be covered by the appended claims. Although specific terms are employed herein, they are used in a generic and descriptive sense only and not for purposes of limitation.

That which is claimed is:

1. A connector port for use in an optical network and adapted for a network interface device to optically connect a connectorized optical fiber from inside the network interface device to a pre-connectorized fiber optic drop cable from outside the network interface device, the connector port comprising:

a bracket mounted to the network interface device; and
a connector receptacle secured to the bracket, the connector receptacle comprising a first end for receiving the connectorized optical fiber and a second end for receiving the pre-connectorized fiber optic drop cable;
wherein the connector port is operable to permit a field technician readily connect, disconnect, and reconfigured the pre-connectorized fiber optic drop cable from outside the network interface device without the need for splicing,
wherein the bracket is secured to an interior wall of the network interface device.

2. A connector port for use in an optical network and adapted for a network interface device to optically connect a connectorized optical fiber from inside the network interface device to a pre-connectorized fiber optic drop cable from outside the network interface device, the connector port comprising:

a bracket mounted to the network interface device; and
a connector receptacle secured to the bracket, the connector receptacle comprising a first end for receiving the connectorized optical fiber and a second end for receiving the pre-connectorized fiber optic drop cable;
wherein the connector port is operable to permit a field technician to readily connect, disconnect, and reconfigured the pre-connectorized fiber optic drop cable from outside the network interface device without the need for splicing,
wherein the connector receptacle is located outside the network interface device and the connector receptacle receives an end portion of the pre-connectorized fiber optic drop cable outside the network interface device.

3. A connector port for use in an optical network and adapted for a network interface device to optically connect a connectorized optical fiber from inside the network interface device to a pre-connectorized fiber optic drop cable from outside the network interface device, the connector port comprising:

a bracket mounted to the network interface device; and
a connector receptacle secured to the bracket, the connector receptacle comprising a first end for receiving the connectorized optical fiber and a second end for receiving the pre-connectorized fiber optic drop cable;
wherein the connector port is operable to permit a field technician to readily connect, disconnect, and reconfigured the pre-connectorized fiber optic drop cable from outside the network interface device without the need for splicing,
wherein the bracket is made of aluminum.

4. A connector port for use in an optical network and adapted for a network interface device to optically connect a connectorized optical fiber from inside the network interface device to a pre-connectorized fiber optic drop cable from outside the network interface device, the connector port comprising:

a bracket mounted to the network interface device; and
a connector receptacle secured to the bracket, the connector receptacle comprising a first end for receiving the connectorized optical fiber and a second end for receiving the pre-connectorized fiber optic drop cable;
wherein the connector port is operable to permit a field technician to readily connect, disconnect, and reconfigured the pre-connectorized fiber optic drop cable from outside the network interface device without the need for splicing,
wherein the connector receptacle is secured within the bracket using a treaded nut.

5. A connector port for use in an optical network and adapted for a network interface device to optically connect a connectorized optical fiber from inside the network interface device to a pre-connectorized fiber optic drop cable from outside the network interface device, the connector port comprising:
 a bracket mounted to the network interface device; and
 a connector receptacle secured to the bracket, the connector receptacle comprising a first end for receiving the connectorized optical fiber and a second end for receiving the pre-connectorized fiber optic drop cable;

wherein the connector port is operable to permit a field technician to readily connect, disconnect, and reconfigured the pre-connectorized fiber optic drop cable from outside the network interface device without the need for splicing, wherein the connector receptacle is secured within the bracket using at least one of a snap-fit and a press-fit.

* * * * *